(12) United States Patent
Bhardwaj et al.

(10) Patent No.: US 8,434,040 B2
(45) Date of Patent: Apr. 30, 2013

(54) CLOCK-RECONVERGENCE PESSIMISM REMOVAL IN HIERARCHICAL STATIC TIMING ANALYSIS

(75) Inventors: Sarvesh Bhardwaj, Fremont, CA (US); Khalid Rahmat, Fremont, CA (US); Kayhan Kucukcakar, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/095,713

(22) Filed: Apr. 27, 2011

(65) Prior Publication Data

US 2012/0278778 A1 Nov. 1, 2012

(51) Int. Cl.
*G06F 17/50* (2006.01)
(52) U.S. Cl.
USPC .......................... 716/108; 716/113; 716/134
(58) Field of Classification Search .................. 716/108, 716/113, 134
See application file for complete search history.

(56) References Cited

U.S. PATENT DOCUMENTS

| | | | |
|---|---|---|---|
| 6,550,045 B1 * | 4/2003 | Lu et al. ........................ | 716/114 |
| 7,472,365 B1 | 12/2008 | Manaker, Jr. | |
| 7,475,297 B1 | 1/2009 | Manaker, Jr. | |
| 2005/0198601 A1 * | 9/2005 | Kuang et al. ..................... | 716/6 |
| 2008/0263488 A1 * | 10/2008 | Banerji et al. .................... | 716/6 |
| 2010/0180242 A1 * | 7/2010 | Kalafala et al. ................... | 716/6 |
| 2012/0124534 A1 * | 5/2012 | Kalafala et al. ............... | 716/108 |

OTHER PUBLICATIONS

Enami, T. et al., "Statistical Timing Analysis Considering Clock Jitter and Skew Due to Power Supply Noise and Process Variation," IECE Trans. Fundamentals, Dec. 2010, pp. 2399-2408, vol. E93-A, No. 12.
Hachiya, K. et al., "Fast Methods to Estimate Clock Jitter Due to Power Supply Noise," IEICE Trans. Fundamentals, Apr. 2007, pp. 741-747, vol. E90-A, No. 4.
Held, S., Timing Closure in Chip Design, Dissertation, University of Bonn, Jun. 2008, 193 pages, [Online] [Retrieved on Aug. 8, 2011] Retrieved from the Internet<URL:hss.ulb.uni-bonn.de>.
Kapur, R. et al., "Fundamentals of Timing Information for Test: How Simple Can We Get?" IEEE International Test Conference, 2007. ITC 2007, pp. 1-7.
Sundareswaran, S. et al., "A Timing Methodology Considering Within-Die Clock Skew Variations." SOC Conference, Sep. 17-20, 2008, IEEE International, pp. 351-356.

(Continued)

*Primary Examiner* — Thuan Do
*Assistant Examiner* — Mohammed Alam
(74) *Attorney, Agent, or Firm* — Fenwick & West LLP (57) ABSTRACT

A system and a method are disclosed for performing clock re-convergence pessimism removal (CRPR) during hierarchical static timing analysis (HSTA). A clock network is divided into a plurality of blocks. A top level includes clock components not included in the plurality of blocks. Block level analysis is performed to determine timing information for each of the plurality of blocks. If available, CRPR data from top level analysis is accounted for in block level analysis. Subsequently, similar analysis is performed on components that are included in top level analysis. If available, CRPR data from bottom level analysis is accounted for in top level analysis. CRPR data can be requested during levels of analysis from the other level. These steps are repeated until analysis is complete.

10 Claims, 8 Drawing Sheets

OTHER PUBLICATIONS

Sundareswaran,S. "Statistical Characterization for Timing Sign-Off: From Silicon to Design and Back to Silicon," Dissertation, University of Texas at Austin, May 2009, 205 pages, [Online] [Retrieved on Aug. 8, 2011] Retrieved from the Internet<URL:repositories.lib.utexas.edu>.

Zejda, J. et al., "General Framework for Removal of Clock Network Pessimism," Computer Aided Design, 2002. ICCAD 2002. IEEE/ACM International Conference on Digital Object Identifier: 10.1109/ICCAD.2002.1167599, 2002, pp. 632-639.

* cited by examiner

CLOCK-RECONVERGENCE PESSIMISM REMOVAL IN HIERARCHICAL STATIC TIMING ANALYSIS

BACKGROUND

1. Field of Art

The disclosure generally relates to the field of static timing analysis. More specifically, the disclosure relates to performing hierarchical static timing analysis.

2. Description of the Related Art

The amount of runtime and memory used to perform flat static timing analysis in electronic design automation software has significantly increased as designs have become more complex. Hierarchical static timing analysis (HSTA) is increasingly used to reduce peak memory and runtime by up to an order of magnitude or more. Clock re-convergence pessimism removal (CRPR) is used in flat static timing analysis to improve calculations and produce more accurate timing data. CRPR can identify common points in a clock network to improve the amount of slack for a timing path between two latches when the clock pins of the two latches are communicatively coupled to a common point. This reduces unnecessarily pessimistic timing calculations. However, performing CRPR in HSTA has proven difficult due to dependence on not only clock timing, but clock topology as well. In HSTA, some clock paths travel between multiple blocks or hierarchies. This means that the complete clock network cannot be seen during any single level of analysis since the clock network can traverse multiple hierarchies. Thus, conventional block level analysis is unable to provide accurate clock re-convergence pessimism (CRP) values when a common point is located in another block or hierarchy. HSTA also should accurately analyze different types of CRP values including static CRP, dynamic CRP, and various CRP modes such as muxed-CRP removal, same transition mode and statistical mode.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes performing clock re-convergence pessimism removal (CRPR) during hierarchical static timing analysis (HSTA). A clock network is divided into a plurality of blocks. A top level includes clock components not included in the plurality of blocks. The top level can also include a subset of the components included in the plurality of blocks. Block level analysis is performed to determine timing information for each of the plurality of blocks. If available, CRPR data from top level analysis is accounted for in block level analysis. Subsequently, similar analysis is performed on components that are included in top level analysis. If available, CRPR data from bottom level analysis is accounted for in top level analysis. CRPR data can be requested during levels of analysis from the other level. Accordingly, CRPR data can also be sent and received during analysis. These steps are repeated until analysis is complete. It should be noted that Hierarchical CRPR analysis does not only correct overly pessimistic calculations. In some situations, flat static timing analysis performed on a block or top level may produce overly optimistic timing data. Hierarchical CRPR can improve such a calculation with more accurate data as well.

Electronic Design Automation Process Overview

Figure 1:
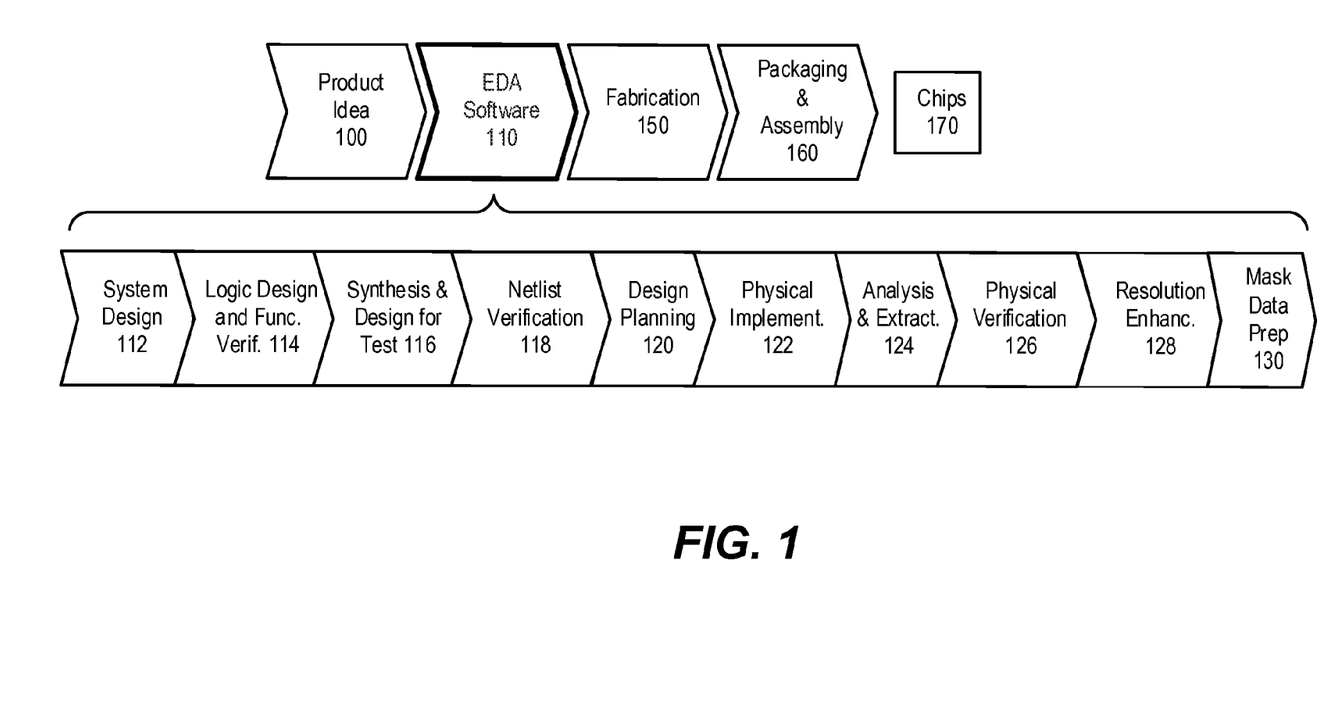
FIG. 1 illustrates one embodiment of components of an example machine able to read instructions from a machine-readable medium and execute them in a processor (or controller).

FIG. 1 illustrates various steps in the design and fabrication of an integrated circuit. The process typically starts with a product idea 100, which is realized using Electronic Design Automation (EDA) software 110. Chips 170 can then be produced from the finalized design by performing fabrication 150 and packaging and assembly 160.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, placement and routing can be performed in the physical implementation step 122.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out for production of masks to produce finished chips.

Embodiments of the present invention can be used during one or more of the above-described stages. Specifically, in some embodiments the present invention can be used during logic design and functional verification step 114.

Computing Machine Architecture

Figure 2:
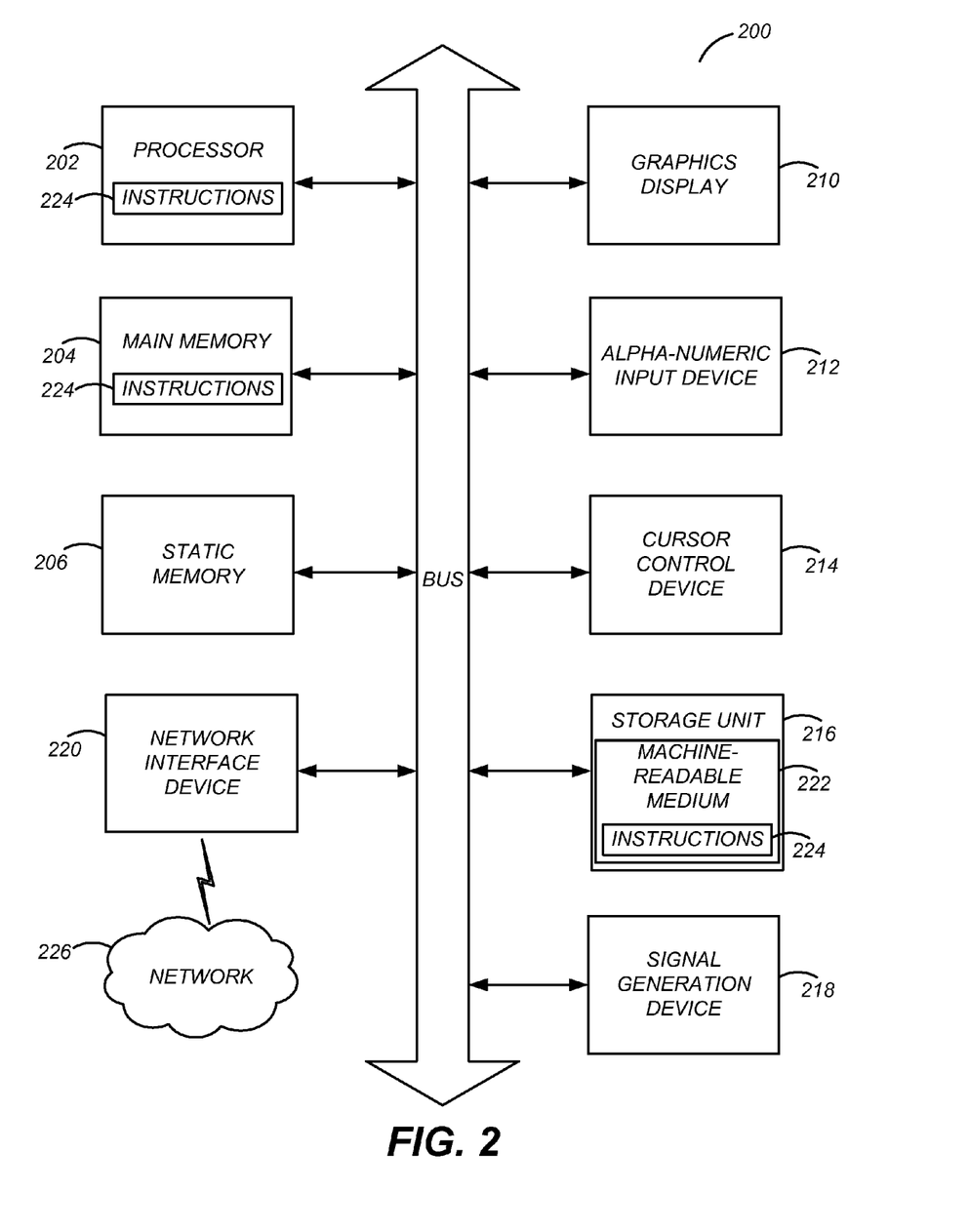
FIG. 2 illustrates one embodiment of components of an example machine able to read instructions from a machine-readable medium and execute them in a processor (or controller).

The disclosed embodiments may be configured as instructions executable by a machine in one embodiment. FIG. 2 is a block diagram illustrating components of an example machine able to read instructions from a machine-readable medium and execute them in a processor (or controller). This is an example of a machine that may be used to perform various steps described in the Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Control Flow

Figure 3:
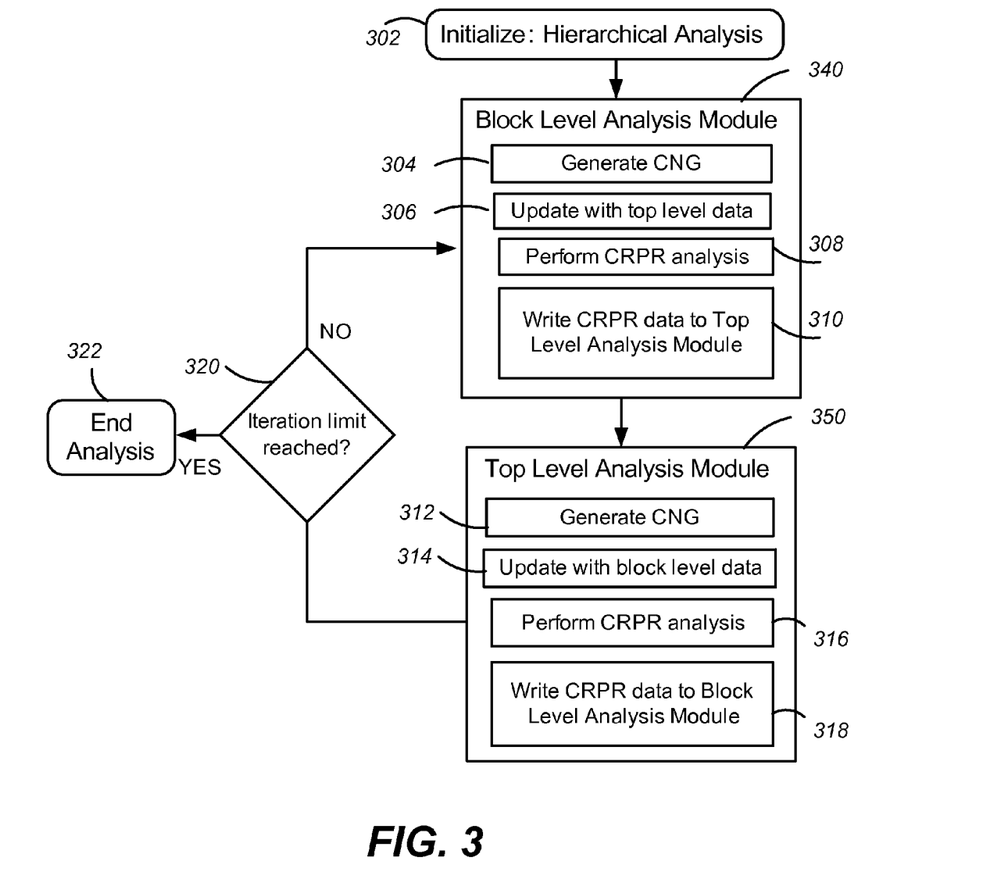
FIG. 3 illustrates one embodiment of a method for performing HSTA with CRPR.

Referring now to FIG. 3, illustrated is one embodiment of the iteration based CRPR flow performed during HSTA in electronic design automation software. The process is principally performed by the block level analysis module 340 and the top level analysis module 350. Steps that are not assigned to a specific module may be performed by the block level analysis module 340, the top level analysis module 350 or any number of additional modules. HSTA is initialized 302 by dividing a clock and data network into a plurality of blocks. It is not necessary for all clock components to be contained in a block. Clock components that are not included in a block remain as part of the top level hierarchy. In one embodiment, some clock components can be included in multiple blocks or in a block and the top level.

After initialization, the block level analysis module 340 performs block level analysis on the plurality of blocks. In one embodiment, analysis is performed on each of the plurality of blocks during every iteration. Alternatively, analysis may be performed on a subset of the plurality of blocks. For example, after an initial iteration which analyzes all blocks, only those blocks that are receiving a request for CRPR data or requested CRPR data are analyzed. For each block being analyzed, a clock network graph (CNG) is generated 304 of the clock components contained by the block being analyzed. When available, CRPR data received from the top level analysis module 350 is stored in the block level analysis module 340 and is used to improve the accuracy of subsequent calculations. If no top level analysis has been performed prior to the current block-level analysis, no top level data is available and the step may be omitted. Using the CNG with top level data, CRPR analysis is performed 308 to determine timing information.

Subsequently, information previously requested by the top level model generation is written 310 for use in top level analysis. In the initial iteration, no request can have been received from the top-level module since top level analysis has not yet occurred. In this situation, the step can be omitted. In one embodiment, CRPR data that may be of interest to the top level analysis module is identified during block level analysis without a request from the top level analysis module 350. Anticipating a potential request from the top level analysis module 350 can produce more accurate results in a smaller number of iterations. This can also reduce the total number of iterations that are run to reach a threshold and save processing time. The block level analysis module 340 also writes 310 requests to the top level analysis module 350 for CRPR data that can increase the accuracy of timing analysis performed by the block level analysis module 340.

After block level analysis has been completed, control transfers to the top level analysis module 350. A clock network graph corresponding to clock components that are part of the top level is generated 312. In one embodiment, the top level CNG also includes clock components that are near the border of blocks or a certain number of layers of components into blocks. When more components are included in the top level CNG, fewer requests are generally sent for block level analysis in a subsequent iteration. The CRPR data is then updated 314 to include block level data sent from the block level analysis module 340. CRPR analysis is then performed 316 using the updated CRPR data to determine timing information. Areas where additional CRPR data involving components not visible to the top level analysis module will produce more accurate timing information are identified so that requests can be written 318 to the block level analysis module 340 for additional information. In addition to requests for data, responses to requests from a previous block level analysis iteration can also be written 318 to block level analysis module 340 for use during its next iteration.

After each iteration of block level analysis and top level analysis, it is determined whether the iteration limit has been reached 320. In one embodiment, iterations are continued until the modifications made due to updated CRPR information do not exceed a threshold. Alternatively, iterations may continue as long as any requests have been made during the previous iteration during either block level analysis or top level analysis.

Figure 4:
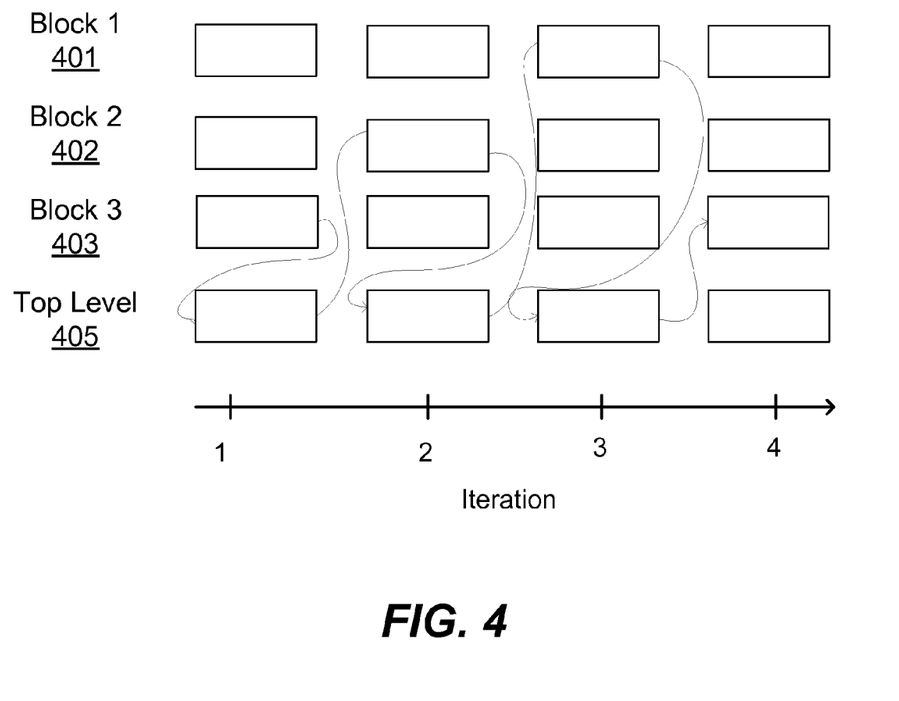
FIG. 4 illustrates one embodiment of control transferring between block level analysis and top level analysis.
Figure 7:
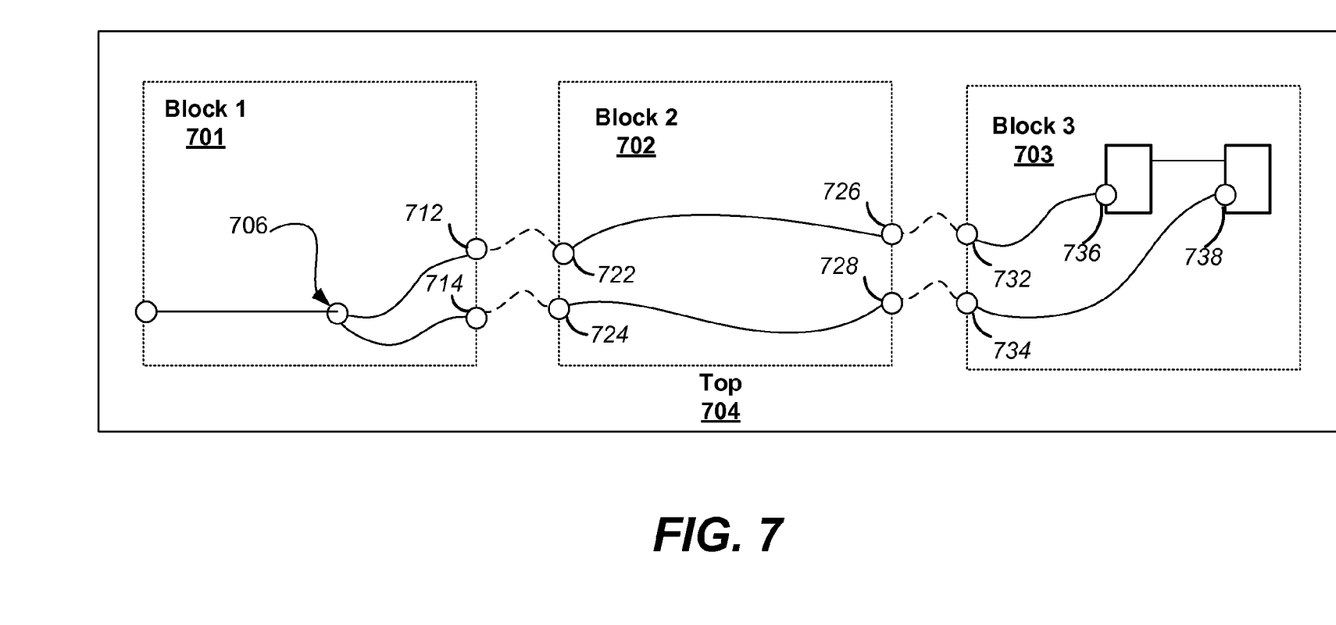
FIG. 7 illustrates a situation with a common point in a block separate from the block being analyzed.

FIG. 4 illustrates one example embodiment of control transferring between block level analysis and top level analysis in four iterations. Referring first to FIG. 7, FIG. 7 illustrates an example situation with a common point in a block 701 separate from the block 703 being analyzed. It should be noted that, in one embodiment, this situation corresponds to the example control flow illustrated in FIG. 4. Block 1 701, block 2 702 and block 3 703 and top level 704 are included in this analysis.

In initial block level analysis of block 3 703, the block level analysis module 340 is unable to see if the two points 732 and 734 on the border of block 3 703 are connected to a common point and uses an unrealistically pessimistic estimate in its timing analysis for points 736 and 738. A request is made to the top level analysis module for a CRPR value between the two points 732 and 734 on the border of block 3 703. During the top level analysis of iteration 1, the top level analysis module 350 determines that the two points 732 and 734 on the border of block 3 703 are coupled to two points 726 and 728 on the border of block 2 702, but is similarly unable to calculate an accurate CRPR value.

In response, the top level analysis module 350 sends a request to the block level analysis module 340 for the CRPR data involving block 2 702. In iteration 2, the block level analysis module 340 receives the request, but is unable to provide accurate CRPR data as it can only see the other end of the clock network generated for block 2 702 at points 722 and 724. The block level analysis module 340 sends a request to the top level analysis module 350 for CRPR data related to points 722 and 724. In the top level analysis portion of iteration 2, the top level analysis module can see that the clock paths associated with the points 722 and 724 travel to block 1 701 at points 712 and 714, but again must send a request to the block level analysis module 340 for additional CRPR data.

In iteration 3, block level analysis module 340 analyzes block 1 701 in response to the request sent from the top level analysis module 350 and locates the common point 706. The CRPR data is sent to the top level analysis module which then has the information need to respond to the request initially made from block 3 703 in iteration 1. This response is sent during the top level analysis portion of iteration 3. In the subsequent block level analysis portion of iteration 4, block level analysis module 340 receives the requested CRPR data for block 3 703 and is able to update the previously overpessimistic timing analysis performed.

Referring now to FIG. 4, illustrated is only a single block transmitting or receiving data per iteration merely to simplify the process illustrated in FIG. 4. The flow illustrated by the arrows could indicate a number of different sequences of events and the subsequent description is illustrative of only one of these possibilities. Three blocks, block 1 401, block 2 402, and block 3 403 are illustrated, though any number of blocks may be included in an embodiment. A top level 405 is also illustrated. In one embodiment, the top level 405 contains components not included in any of the blocks. In iteration 1, blocks 1-3 are analyzed and block 3 sends a request for CRPR data to the top level analysis module. During top level analysis of iteration 1, top level analysis module requests CRPR data from block 2 needed to calculate the CRPR data requested from block 3.

During iteration 2, block 2 receives the CRPR data request from the top level analysis module and responds with the requested data. The top level analysis module determines that it needs additional CRPR data from block 1 to respond to block 3's request and sends a CRPR data request to block 1. In iteration 3, block 1 receives the request from the top level analysis module and responds with the requested CRPR data. The top level analysis then has all of the information needed to respond to block 3's CRPR data request and sends the requested data to the block analysis module. In iteration 4, block 3 receives the CRPR data requested in iteration 1.

It should be noted that in one embodiment all blocks can be analyzed in a single iteration. This means multiple blocks can send and receive CRPR data or requests in a single iteration.

Exemplary Configurations

Figure 5:
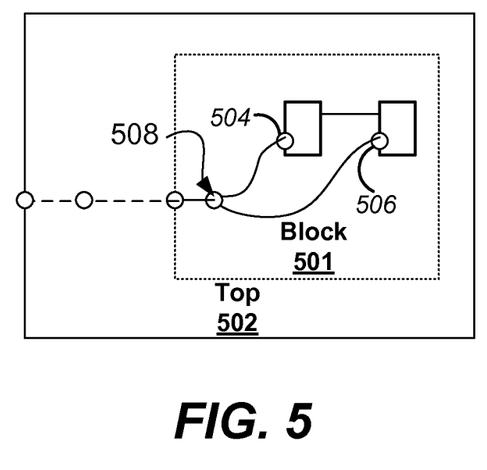
FIG. 5 illustrates a situation with a common point in the block being analyzed.

FIG. 5 illustrates one example embodiment of a situation with a common point in the block being analyzed. The common point is part of the block 501 and not the top level 502. In such a situation, the common point 508 is visible to the block level analysis module when analyzing the block 501 and no CRPR data needs to be requested from the top level analysis module for accurate timing analysis.

Figure 6:
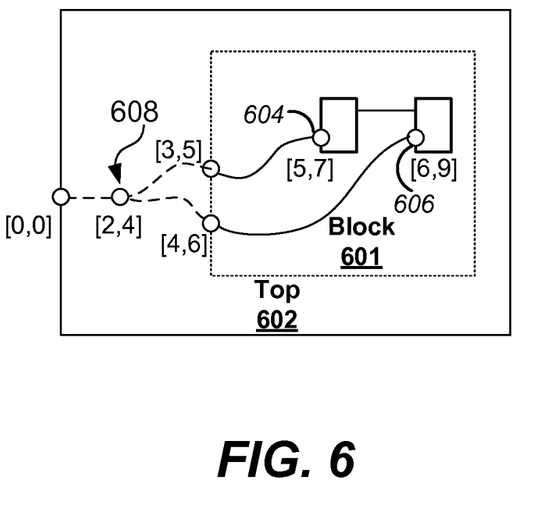
FIG. 6 illustrates a situation with a common point in the top level, outside of the block being analyzed.

FIG. 6 illustrates an example situation with a common point in the top level 602, outside of the block 601 being analyzed. FIG. 6 includes minimum and maximum arrival times at various points in the form of [min, max]. During initial block level analysis, the block level analysis module 340 is unable to see the common point 608 that is outside of the block 601 being analyzed and will assign unrealistically pessimistic timing data to the depicted configuration. However, block level analysis module 340 will recognize that it does not know the path of the two points 604 and 606 located at the block's border and request CRPR data from the top level analysis module. The top level analysis module 350 receives this information and replies with the requested CRPR value. This allows the block level analysis module 340, in a subsequent iteration, to determine more accurate timing information taking into account the common point 608 located outside of the block 601.

In one embodiment, if flat static timing analysis is performed on the example shown in FIG. 6, the CRP that will be removed is the difference between the minimum and maximum clock arrival times at the common point 608. In this case, the difference is 2. This value will be added to the calculated slack and increase it by 2. In contrast, during block level analysis the CRP value will be 0 as the common point lies outside of the block. This will cause the slack to be pessimistic by 2. This pessimism is removed by accounting for CRPR during hierarchical static timing analysis.

Figure 8:
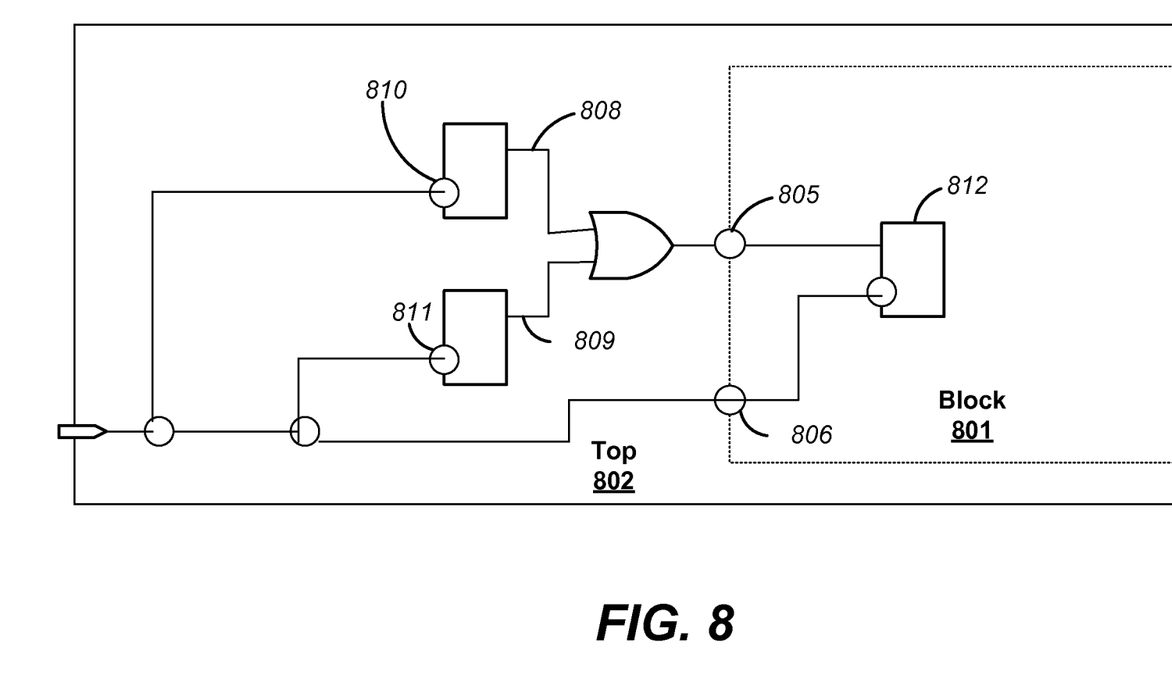
FIG. 8 illustrates an interface path with a launching latch outside the block being analyzed.

FIG. 8 illustrates an example interface path, where the launching latch for a path lies outside of the block being analyzed. In initial block analysis, block analysis module 340 has limited information regarding the timing arrivals at points 1 805 and 2 806 at the edge of the block 801. When analyzing interface paths, block level analysis cannot initially determine accurate timing information at the points 1 805 and 2 806 at the border of the block 801. A request for an accurate CRPR value must be sent from the block level analysis module 340 to the top level analysis module 350. This allows the top level analysis module 350 to determine an accurate CRPR value. In FIG. 8, tag 1 808 and tag 2 809 represent the labels used to differentiate the arrivals corresponding to different latches. The tag 1 808 and tag 2 809 must both be taken into account when determining a CRPR value involving point 1 805. The top level analysis module 350 sends the information regarding the clock pin 810 which launches the tag 1 808 and the clock pin 811 which launches the tag 2 809. After receiving the information related to the clock pins 810 and 811 for tags 1 808 and tag 2 809, respectively, the block level analysis module 340 identifies that it needs to request the top level analysis module 350 for CRPR between the points 810 and 806 and also for CRPR between points 811 and 806. After receiving the request from the block level analysis module 340, the top level analysis module 350 computes the CRP value for the two requests and sends the CRP value to the block level analysis module 340. This enables the block level analysis module 340 to more accurately calculate slack information for latch 812 in the block 801.

Figure 9:
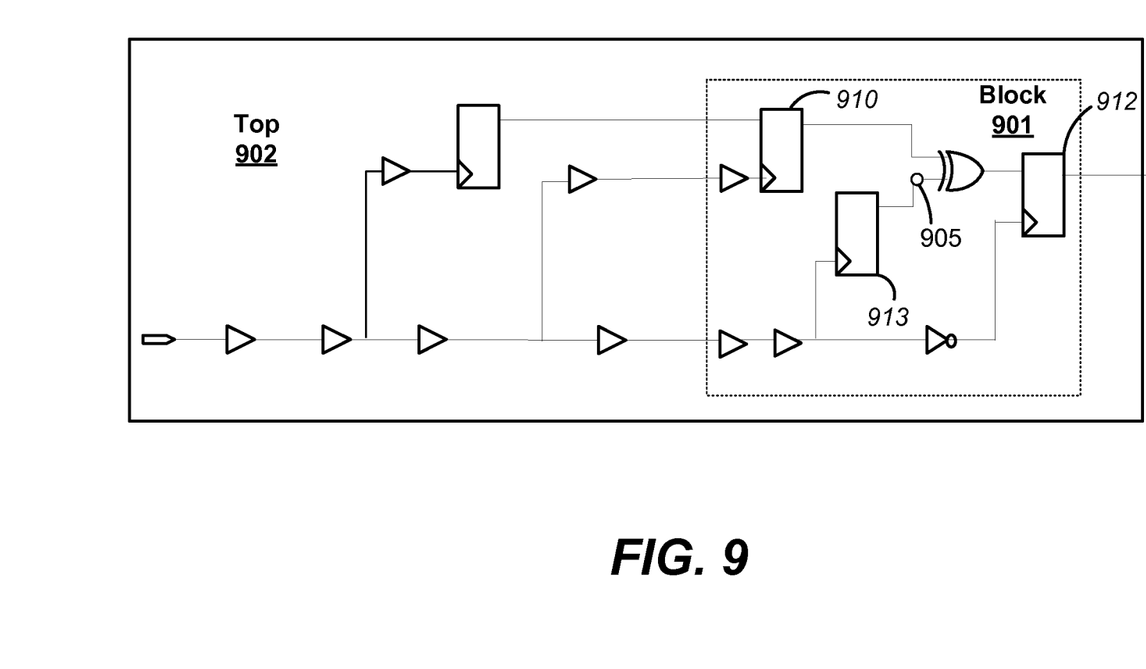
FIG. 9 illustrates a side input situation with launching latch outside the top level being analyzed.

FIG. 9 illustrates a side input path with launching latch outside the top level 902 being analyzed. While performing static timing analysis at the top level hierarchy 902, top level analysis module 350 is unable to see some components located in a block 901. In one embodiment, latch 1 910 and latch 2 912 are visible to the top level analysis module 350, but latch 3 913 is not. The top level analysis module 350 does not see the common point located between the latch 913 launching the arrival at the side input 905 and the capturing latch 912 in the block 901. To enable the top-level analysis module 350 to request the CRPR information corresponding to the side-input path, the block level analysis module 340 sends the clock pin information for the latch 913 along with the arrival time at the side-input 905. Due to limited information regarding components inside the block 901, the top level analysis module 350 requests additional CRPR data from the block level analysis module 340 using the clock pin information for the latch 913 which was specified by the block level analysis module 340 in the previous iteration. Block level analysis module 340 subsequently determines the corresponding CRPR value and returns the value to the top level analysis module 350. This allows the top level analysis module 350 to include the updated CRPR value during the timing of side-input path and produce more accurate timing information.

In one embodiment, a command, e.g., define_crpr, is used by the analysis modules to generate a request for CRPR data from another analysis module. The define_crpr command can include various values that define specific components including pins, latches, and any other clock topology components for which CRPR data may be requested. Additionally, the clock associated with the components may be identified in define_crpr. In another embodiment, define_crpr and set_crpr can be passed a as graph and annotations of crpr data on the graph. In another embodiment, define_crpr and set_crpr can be passed as a collection of data structures.

In one embodiment, a command, e.g., set_crpr is used by the analysis modules to reply with requested CRPR data. The set_crpr command can define the components for which a crpr value applies, similar to the manner described for define_crpr. Additionally, set_crpr includes a calculated CRP value that is transmitted. The CRP value may or may not take into account signal integrity.

Additional Configuration Considerations

Throughout this specification, plural instances may implement components, operations, or structures described as a single instance. Although individual operations of one or more methods are illustrated and described as separate operations, one or more of the individual operations may be performed concurrently, and may not be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein, e.g., in FIGS. 3 through 9, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for iterative clock-reconvergence pessimism removal in hierarchical static timing analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for clock-reconvergence pessimism removal (CRPR) in hierarchical static timing analysis, the method comprising:
   allocating clock components to a plurality of blocks and a top level;
   performing static timing analysis on the top level to determine top level timing information;
   performing static timing analysis on a first of the plurality of blocks to determine first block timing information;
   modifying the top level timing information based on the first block timing information; and
   performing additional static timing analysis on the first of the plurality of blocks if the top level timing information is modified by an amount exceeding a threshold.

2. The method of claim 1, further comprising:
   performing static timing analysis on a second of the plurality of blocks taking into account the modified top level timing information.

3. A non-transitory computer-readable storage medium storing executable computer program instructions for clock-reconvergence pessimism removal (CRPR) in hierarchical static timing analysis, the instructions comprising instructions for:
   allocating clock components to a plurality of blocks and a top level;
   performing static timing analysis on the top level to determine top level timing information;
   performing static timing analysis on a first of the plurality of blocks to determine first block timing information;
   modifying the top level timing information based on the first block timing information; and performing additional static timing analysis on the first of the plurality of blocks if the top level timing information is modified by an amount exceeding a threshold.

4. The non-transitory computer-readable storage medium of claim 3, further comprising:

performing static timing analysis on a second of the plurality of blocks taking into account the modified top level timing information.

5. The method of claim 1, wherein performing static timing analysis on the first of the plurality of blocks takes into account the top level timing information.

6. The method of claim 1, wherein timing information comprises slack for a timing path between two latches.

7. The method of claim 1, wherein the additional static timing analysis performed on the first of the plurality of blocks accounts for the modified top level timing information.

8. The computer-readable storage medium of claim 3, wherein performing static timing analysis on the first of the plurality of blocks takes into account the top level timing information.

9. The computer-readable storage medium of claim 3, wherein timing information comprises slack for a timing path between two latches.

10. The computer-readable storage medium of claim 3, wherein the additional static timing analysis performed on the first of the plurality of blocks accounts for the modified top level timing information.

* * * * *

UNITED STATES PATENT AND TRADEMARK OFFICE
CERTIFICATE OF CORRECTION

PATENT NO. : 8,434,040 B2  
APPLICATION NO. : 13/095713  
DATED : April 30, 2013  
INVENTOR(S) : Sarvesh Bhardwaj, Khalid Rahmat and Kayhan Kucukcakar Page 1 of 1

It is certified that error appears in the above-identified patent and that said Letters Patent is hereby corrected as shown below:

In the Claims:

Column 10, line 42, after "performing" insert --by a computer--.

Signed and Sealed this  
Twentieth Day of August, 2013

Teresa Stanek Rea  
*Acting Director of the United States Patent and Trademark Office*